United States Patent
Sun et al.

(10) Patent No.: US 10,135,087 B2
(45) Date of Patent: Nov. 20, 2018

(54) MATCHING STATE OF CHARGE IN A STRING

(71) Applicant: UniEnergy Technologies, LLC, Mukilteo, WA (US)

(72) Inventors: Chenxi Sun, Mukilteo, WA (US); Jinfeng Wu, Mukilteo, WA (US); Liyu Li, Bellevue, WA (US); Jacob Parks, Everett, WA (US); David Ridley, Shoreline, WA (US)

(73) Assignee: UniEnergy Technologies, LLC, Mukilteo, WA (US)

( * ) Notice: Subject to any disclaimer, the term of this patent is extended or adjusted under 35 U.S.C. 154(b) by 159 days.

(21) Appl. No.: 15/374,782

(22) Filed: Dec. 9, 2016

(65) Prior Publication Data

US 2018/0166726 A1  Jun. 14, 2018

(51) Int. Cl.
| | | |
|---|---|---|
| *H01M 8/18* | (2006.01) | |
| *H01M 8/04537* | (2016.01) | |
| *H01M 8/04828* | (2016.01) | |

(52) U.S. Cl.
CPC ......... *H01M 8/188* (2013.01); *H01M 8/0494* (2013.01); *H01M 8/04619* (2013.01); *H01M 2250/10* (2013.01)

(58) Field of Classification Search
CPC ................................ H01M 10/42; H01M 8/18
USPC ............................................ 429/50, 101–105
See application file for complete search history.

(56) References Cited

U.S. PATENT DOCUMENTS

| | | | | |
|---|---|---|---|---|
| 9,853,306 B2* | 12/2017 | Hennessy | ......... | H01M 8/04186 |
| 9,941,527 B2* | 4/2018 | Li | ..................... | H01M 8/04276 |
| 2005/0158614 A1* | 7/2005 | Hennessy | ......... | H01M 8/04186 429/61 |
| 2011/0086247 A1* | 4/2011 | Keshavarz | .......... | H01M 4/8803 429/9 |
| 2012/0045680 A1* | 2/2012 | Dong | ................ | H01M 8/04186 429/109 |
| 2013/0154364 A1 | 6/2013 | Hennessy | | |

(Continued)

FOREIGN PATENT DOCUMENTS

KR     10-2014-0112708 A     9/2014

OTHER PUBLICATIONS

International Search Report and Written Opinion dated Mar. 29, 2018, issued in corresponding International Application No. PCT/US2017/065422, filed Dec. 8, 2017, 12 pages.

*Primary Examiner* — Abdullah Riyami
*Assistant Examiner* — Nader Alhawamdeh
(74) *Attorney, Agent, or Firm* — Christensen O'Connor Johnson Kindness PLLC

(57) ABSTRACT

A method of operating a redox flow battery string including at least first and second redox flow batteries and an outside power source includes: providing a least first and second redox flow batteries in a string electrically connected in a string, and each redox flow battery having a state-or-charge (SOC) and an electrical load, wherein the electrical load for at least one of the first and second redox flow batteries in the string is powered by the outside power source; obtaining an SOC value for each redox flow battery in the string; identifying a target SOC value in the string; and adjusting the SOC value for at least one of the first and second redox flow batteries to correspond to the target SOC value by using a portion of stored energy in the at least one first or second redox flow battery to supply power to the electrical load.

12 Claims, 14 Drawing Sheets

(56) References Cited

U.S. PATENT DOCUMENTS

| | | | |
|---|---|---|---|
| 2013/0177789 A1* | 7/2013 | Kampanatsanyakorn | ................... H01M 8/188 429/70 |
| 2015/0017556 A1 | 1/2015 | Kim et al. | |
| 2015/0226806 A1* | 8/2015 | Kim ....................... | H01M 8/188 429/451 |
| 2016/0006052 A1* | 1/2016 | Li ......................... | H01M 8/188 429/418 |
| 2016/0315339 A1* | 10/2016 | Darling ................. | H01M 8/188 |

* cited by examiner

MATCHING STATE OF CHARGE IN A STRING

BACKGROUND

Concerns over the environmental consequences of burning fossil fuels have led to an increasing use of renewable energy generated from sources such as solar and wind. The intermittent and varied nature of such renewable energy sources, however, has made it difficult to fully integrate these energy sources into existing electrical power grids and distribution networks. A solution to this problem has been to employ large-scale electrical energy storage (EES) systems. These systems are widely considered to be an effective approach to improve the reliability, power quality, and economy of renewable energy derived from solar or wind sources.

In addition to facilitating the integration of renewable wind and solar energy, large scale EES systems also may have the potential to provide additional value to electrical grid management, for example: resource and market services at the bulk power system level, such as frequency regulation, spinning reserves, fast ramping capacity, black start capacity, and alternatives for fossil fuel peaking systems; transmission and delivery support by increasing capability of existing assets and deferring grid upgrade investments; micro-grid support; and peak shaving and power shifting.

Among the most promising large-scale EES technologies are redox flow batteries (RFBs). RFBs are special electrochemical systems that can repeatedly store and convert megawatt-hours (MWhs) of electrical energy to chemical energy and chemical energy back to electrical energy when needed. RFBs are well-suited for energy storage because of their ability to tolerate fluctuating power supplies, bear repetitive charge/discharge cycles at maximum rates, initiate charge/discharge cycling at any state of charge, design energy storage capacity and power for a given system independently, deliver long cycle life, and operate safely without fire hazards inherent in some other designs.

In simplified terms, an RFB electrochemical cell is a device capable of either deriving electrical energy from chemical reactions, or facilitating chemical reactions through the introduction of electrical energy. In general, an electrochemical cell includes two half-cells, each having an electrolyte. The two half-cells may use the same electrolyte, or they may use different electrolytes. With the introduction of electrical energy, species from one half-cell lose electrons (oxidation) to their electrode while species from the other half-cell gain electrons (reduction) from their electrode.

Multiple RFB electrochemical cells electrically connected together in series within a common housing are generally referred to as an electrochemical "stack". One or more stacks electrically connected, assembled, and controlled together in a common container are generally referred to as a "battery", and multiple batteries electrically connected and controlled together are generally referred to as a "string". Multiple strings electrically connected and controlled together may be generally referred to as a "site". Sites may be considered strings on a larger scale.

A common RFB electrochemical cell configuration includes two opposing electrodes separated by an ion exchange membrane or other separator, and two circulating electrolyte solutions, referred to as the "anolyte" and "catholyte". The energy conversion between electrical energy and chemical potential occurs instantly at the electrodes when the liquid electrolyte begins to flow through the cells.

To meet industrial demands for efficient, flexible, rugged, compact, and reliable large-scale ESS systems with rapid, scalable, and low-cost deployment, there is a need for improved RFB systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a method of operating a redox flow battery string including at least first and second redox flow batteries and an outside power source is provided. The method includes: providing a least first and second redox flow batteries in a string electrically connected in a string, and each redox flow battery in the string comprising an electrochemical cell in fluid communication with anolyte and catholyte storage tanks, and each redox flow battery having a state-or-charge (SOC) and an electrical load, wherein the electrical load for at least one of the first and second redox flow batteries is powered by the outside power source; obtaining an SOC value for each redox flow battery in the string; identifying a target SOC value in the string; and adjusting the SOC value for at least one of the first and second redox flow batteries in the string to correspond to the target SOC value by using a portion of stored energy in at least one first or second redox flow batteries to supply power to the electrical load.

In accordance with another embodiment of the present disclosure, a method of operating a redox flow battery string including at least first and second redox flow batteries and an outside power source is provided. The method includes: providing a least first and second redox flow batteries in a string electrically connected in a string, and each redox flow battery in the string comprising an electrochemical cell in fluid communication with anolyte and catholyte storage tanks, and each redox flow battery having a state-or-charge (SOC) and an electrical load, wherein the electrical load is a balance of plant electrical load required to operate each of the plurality of redox flow batteries in the string, wherein the electrical load for at least one of the first and second redox flow batteries is powered by the outside power source; obtaining an SOC value for each redox flow battery in the string; identifying a target SOC value in the string, wherein the target SOC value is a function of the SOC values for all of the redox flow batteries in the string; and adjusting the SOC value for at least one of the first and second redox flow batteries in the string to correspond to the target SOC value by using a portion of stored energy in at least one of the first or second redox flow batteries to supply power to the electrical load of at least one of the first and second redox flow batteries In any of the embodiments described herein, the method further may include a third redox flow battery in the string.

In any of the embodiments described herein, the electrical load for each of the redox flow batteries in the string may be a balance of plant electrical load required to operate each of the plurality of redox flow batteries in the string.

In any of the embodiments described herein, the target SOC value may be a function of the SOC values for all of the redox flow batteries in the string.

In any of the embodiments described herein, adjusting the SOC value for at least one redox flow battery in the string to correspond to the target SOC value may include reducing the SOC value for at least one redox flow battery in the string to correspond to the target SOC value.

In any of the embodiments described herein, adjusting the SOC value for at least one of the first and second redox flow batteries in the string may be controlled by a battery management system.

In any of the embodiments described herein, each of the redox flow batteries in the string may be vanadium redox flow batteries, and the SOC value for each redox flow battery in the string may be an open circuit value (OCV) measurement.

In any of the embodiments described herein, the OCV measurement may be the difference in electrical potential between selected anolyte and catholyte reference points for each redox flow battery.

In any of the embodiments described herein, the SOC value for each redox flow battery in the string may be measured by coulomb counting.

In any of the embodiments described herein, the redox flow battery string may be an islanded system including at least first and second redox flow batteries and an outside power source, wherein the outside power source is independent of the grid.

In any of the embodiments described herein, the auxiliary power source may be an energy generator or another battery.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 4:
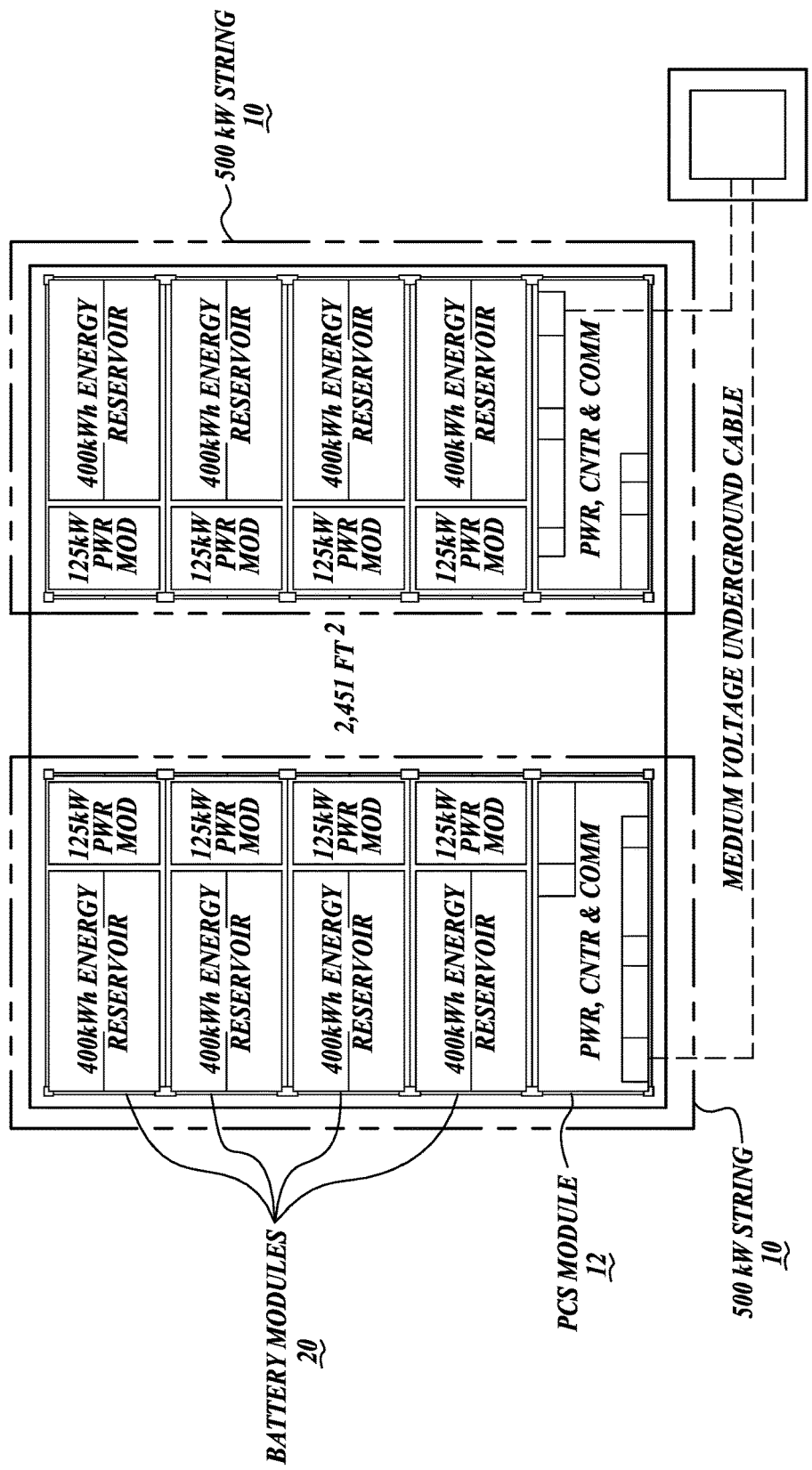
FIG. 4 is schematic view of a 1 MW site in accordance with one embodiment of the present disclosure.
Figure 5:
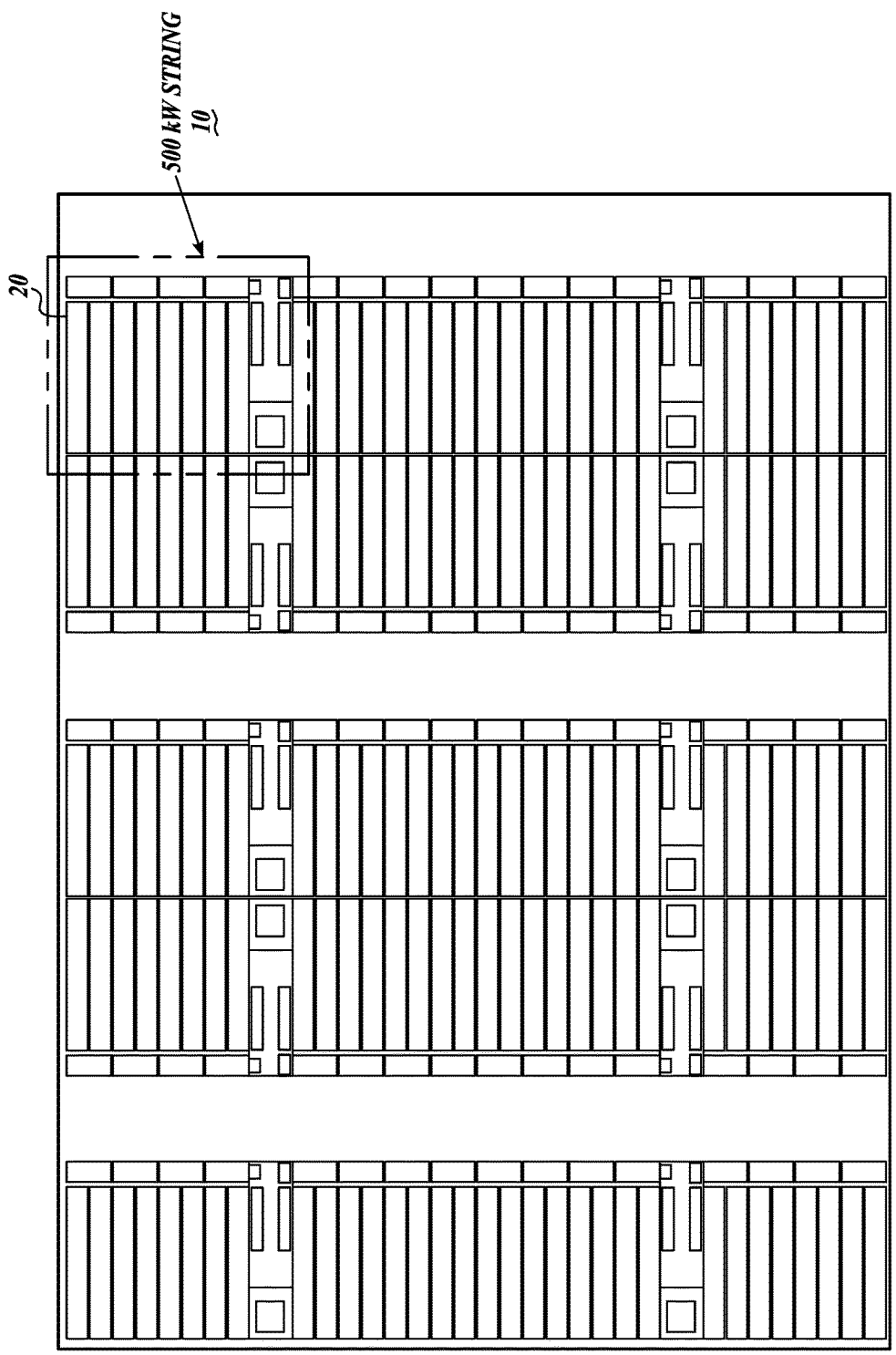
FIG. 5 is a schematic view of a 10 MW site in accordance with one embodiment of the present disclosure.

Embodiments of the present disclosure are directed to redox flow batteries (RFBs), systems and components thereof, stacks, strings, and sites, as well as methods of operating the same. Referring to FIGS. 1-3B, a redox flow battery 20 in accordance with one embodiment of the present disclosure is provided. Multiple redox flow batteries may be configured in a "string" of batteries, and multiple strings may be configured into a "site" of batteries. Referring to FIG. 4, a non-limiting example of a site is provided, which includes two strings 10, each having four RFBs 20. Referring to FIG. 5, another non-limiting example of a site is provided, which includes twenty strings 10, each having four RFBs 20. RFBs, systems and components thereof, stacks, strings, and sites are described in greater detail below.

Redox Flow Battery

Figure 1:
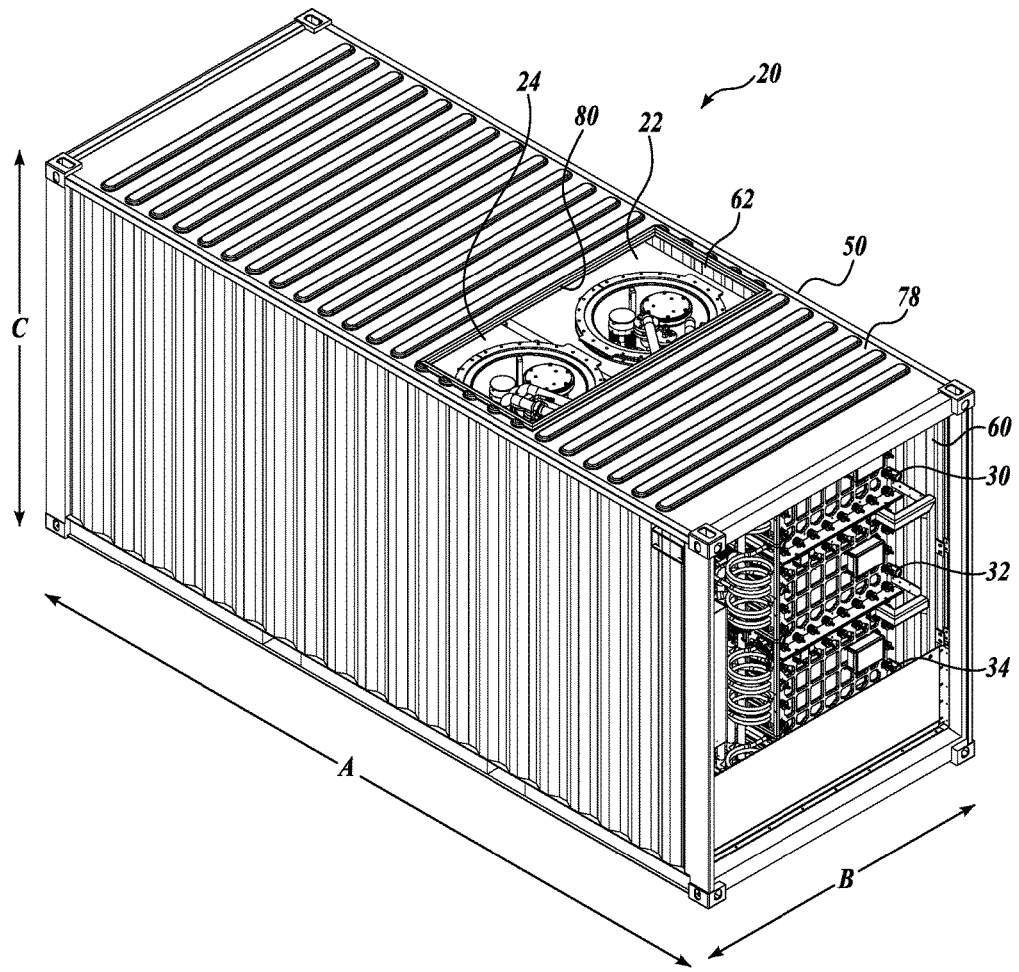
FIG. 1 is an isometric view of a redox flow battery (RFB) module in accordance with one embodiment of the present disclosure.
Figure 2:
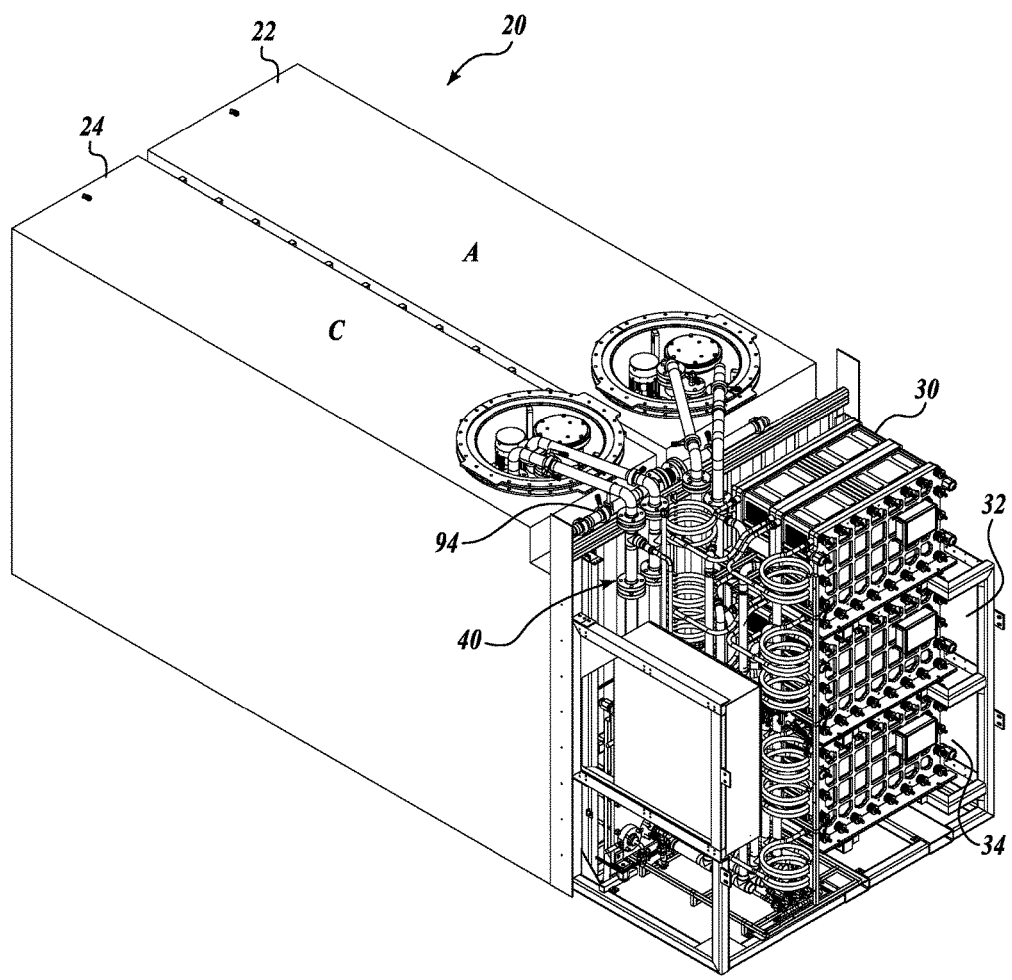
FIG. 2 is an isometric view of the RFB module of FIG. 1 with the outer container removed.

Referring to FIGS. 1 and 2, major components in an RFB 20 include the anolyte and catholyte tank assemblies 22 and 24, the stacks of electrochemical cells 30, 32, and 34, a system for circulating electrolyte 40, an optional gas management system 94, and a container 50 to house all of the components and provide secondary liquid containment.

In the present disclosure, flow electrochemical energy systems are generally described in the context of an exemplary vanadium redox flow battery (VRB), wherein a $V^{3+}/V^{2+}$ sulfate solution serves as the negative electrolyte ("anolyte") and a $V^{5+}/V^{4+}$ sulfate solution serves as the positive electrolyte ("catholyte"). However, other redox chemistries are contemplated and within the scope of the present disclosure, including, as non-limiting examples, $V^{2+}/V^{3+}$ vs. $Br^-/ClBr_2$, $Br_2/Br^-$ vs. $S/S^{2-}$, $Br^-/Br_2$ vs. $Zn^{2+}/Zn$, $Ce^{4+}/Ce^{3+}$ vs. $V^{2+}/V^{3+}$, $Fe^{3+}/Fe^{2+}$ vs. $Br_2/Br^-$, $Mn^{2+}/Mn^{3+}$ vs. $Br_2/Br^-$, $Fe^{3+}/Fe^{2+}$ vs. $Ti^{2+}/Ti^{4+}$, etc.

As a non-limiting example, in a vanadium flow redox battery (VRB) prior to charging, the initial anolyte solution and catholyte solution each include identical concentrations of $V^{3+}$ and $V^{4+}$. Upon charge, the vanadium ions in the anolyte solution are reduced to $V^{2+}/V^{3+}$ while the vanadium ions in the catholyte solution are oxidized to $V^{4+}/V^{5+}$.

Referring to the schematic in FIG. 3A, general operation of the redox flow battery system 20 of FIGS. 1 and 2 will be described. The redox flow battery system 20 operates by circulating the anolyte and the catholyte from their respective tanks that are part of the tank assemblies 22 and 24 into the electrochemical cells, e.g., 30 and 32. (Although only two electrochemical cells are needed to form a stack of cells, additional electrochemical cells in the illustrated embodiment of FIG. 3A include electrochemical cells 31, 33 and 35.) The cells 30 and 32 operate to discharge or store energy as directed by power and control elements in electrical communication with the electrochemical cells 30 and 32.

In one mode (sometimes referred to as the "charging" mode), power and control elements connected to a power source operate to store electrical energy as chemical potential in the catholyte and anolyte. The power source can be any power source known to generate electrical power, including renewable power sources, such as wind, solar, and hydroelectric. Traditional power sources, such as combustion, can also be used.

In a second ("discharge") mode of operation, the redox flow battery system 20 is operated to transform chemical potential stored in the catholyte and anolyte into electrical energy that is then discharged on demand by power and control elements that supply an electrical load.

Each electrochemical cell 30 in the system 20 includes a positive electrode, a negative electrode, at least one catholyte channel, at least one anolyte channel, and an ion transfer membrane separating the catholyte channel and the anolyte channel. The ion transfer membrane separates the electrochemical cell into a positive side and a negative side. Selected ions (e.g., H+) are allowed to transport across an ion transfer membrane as part of the electrochemical charge and discharge process. The positive and negative electrodes are configured to cause electrons to flow along an axis normal to the ion transfer membrane during electrochemical cell charge and discharge (see, e.g., line 52 in FIG. 3A). As can be seen in FIG. 3A, fluid inlets 48 and 44 and outlets 46 and 42 are configured to allow integration of the electrochemical cells 30 and 32 into the redox flow battery system 20.

Figure 3A:
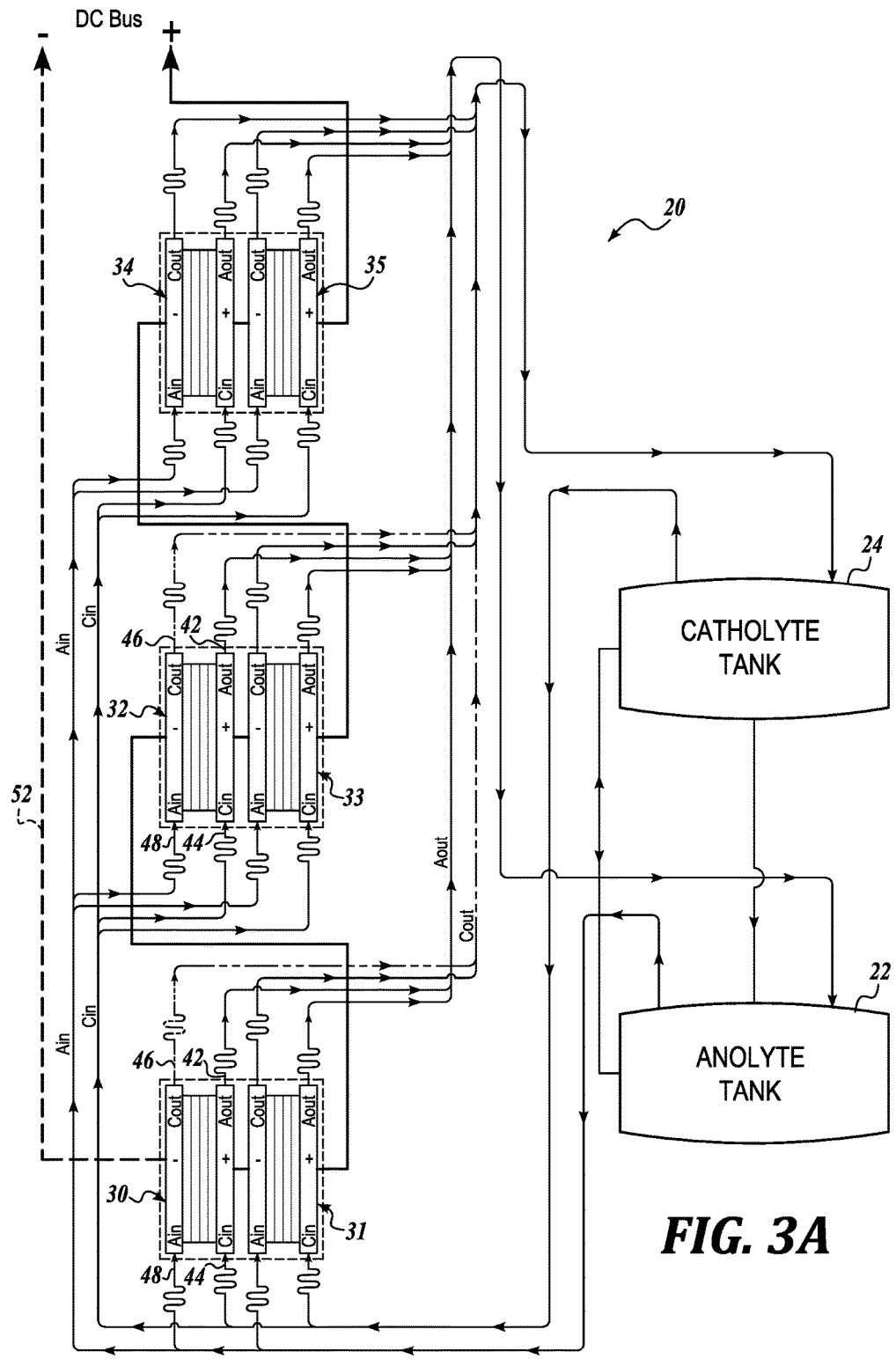
FIGS. 3A and 3B are schematic views of various components of the RFB module of FIGS. 1 and 2.
Figure 3B:
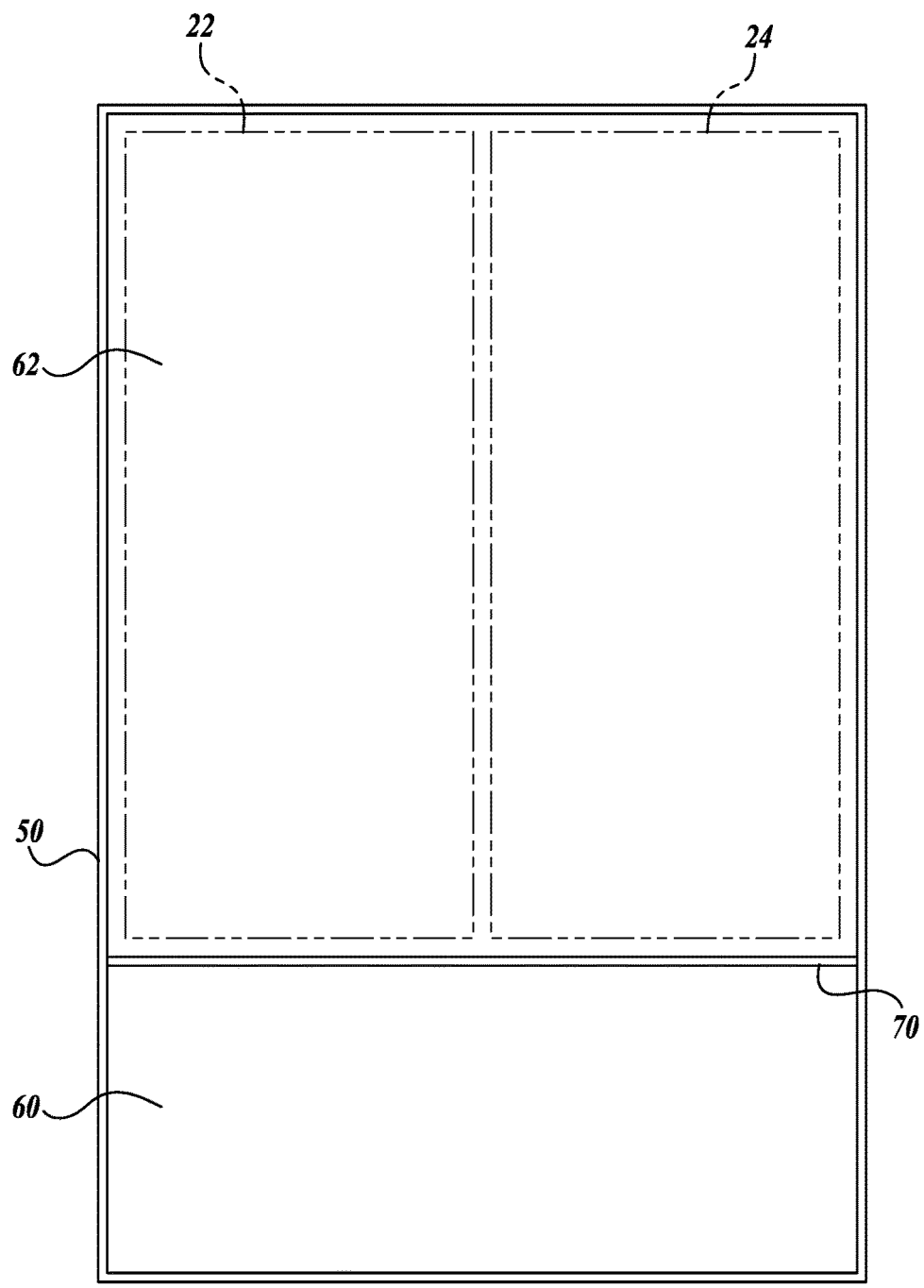

To obtain high voltage, high power systems, a plurality of single electrochemical cells may be assembled together in series to form a stack of electrochemical cells (referred to herein as a "stack," a "cell stack," or an "electrochemical cell stack"), e.g., 30 or 32 in FIG. 3A. Several cell stacks may then be further assembled together to form a battery system 20. Stacks may be connected in strings in series or in parallel. A MW-level RFB system generally has a plurality of cell stacks, for example, with each cell stack having more than twenty electrochemical cells. As described for individual electrochemical cells, the stack is also arranged with positive and negative current collectors that cause electrons to flow through the cell stack generally along an axis normal to the ion transfer membranes and current collectors during electrochemical charge and discharge (see, e.g., line 52 shown in FIG. 3A).

At any given time during battery system 20 charging or discharging mode, reactions only occur for the electrolyte that is contained inside electrochemical cells. The energy stored in the battery system 20 increases or decreases according to the charging and discharging power applied to the electrochemical cells.

String and Site Control System

Figure 6:
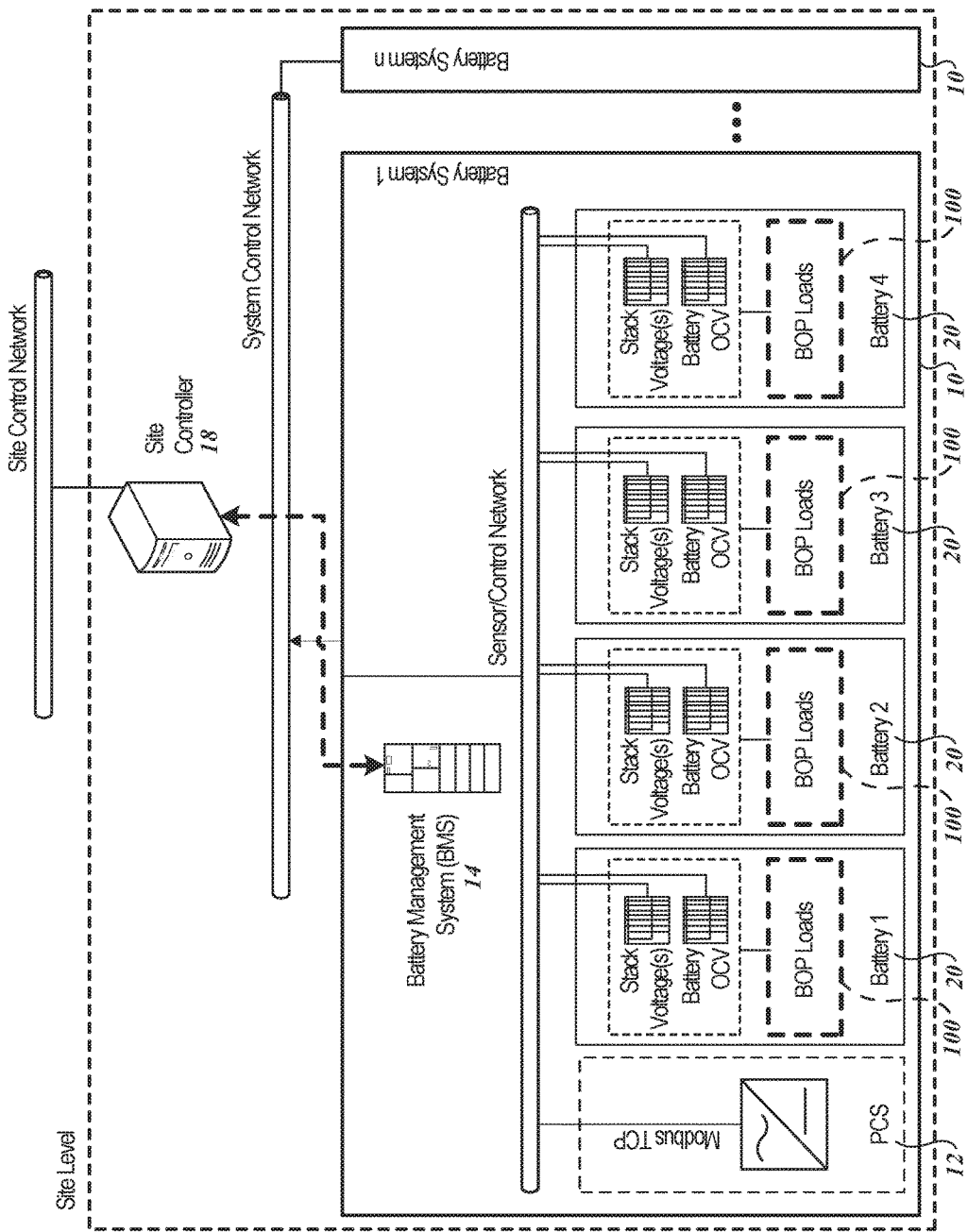
FIG. 6 is a control diagram for a site, for example, the sites of FIG. 4 or 5.

As noted above, a string 10 is a building block for a multiple MW site. As seen in the exemplary layouts in FIGS. 4 and 5, each string 10 includes four battery containers connected in series to a power and control system (PCS) 12 container. As can be seen in FIG. 6, the control system for each string includes a battery management system (BMS) 14 with local control provided, for example, by a human machine interface (HMI). The BMS 14 interprets remote commands from the site controller 18, for example, a customer requirement to charge or discharge, as it simultaneously directs the appropriate operations for each battery and sub-component in the string 10 via a communication network. At the same time, according to programmed logic, the BMS 14 interprets string 10 operating data from the batteries 20, PCS, and their associated sub-components to evaluate service or diagnose maintenance requirements. See also FIG. 6 for string and site control diagrams.

As a non-limiting example, an exemplary VRB may have capacity up to 125 kW for four hours (500 kW-hours) and a storage string may have capacity up to 500 kW for four hours (2 MW-hours). To be effective as a large scale energy storage system that can be operated to provide multiple layered value streams, individual batteries, designed and manufactured to meet economies of scale, may be assembled as building blocks to form multiple-megawatt sites, for example 5 MW, 10 MW, 20 MW, 50 MW, or more. Managing these large installations requires multi-level control systems, performance monitoring, and implementation of various communications protocols.

Referring to FIG. 4, an exemplary 1 MW system layout shows two 500 kW building block sub-assemblies or strings 10 that each include four battery modules 20 and one PCS module 102. Using this approach, multi-level larger systems may be assembled, for example, the single-level 10 MW system shown in FIG. 5. As described in greater detail below, the unique combination of systems and components described herein provide significantly more energy density in a compact flowing electrolyte battery module 20 and string 10 design than previously designed flowing electrolyte batteries, such earlier generation VRBs. Other hybrid flowing electrolyte batteries, such as ZnBr2 systems, may demonstrate similar characteristics.

Battery Container System, Electrolyte Tank Assembly, and General Arrangement

Referring now to FIGS. 1 and 2, each RFB 20 includes a container 50 that houses the remaining components of the system in a substantially closed manner. These remaining components generally include the anolyte and catholyte tank assemblies 22 and 24, the stacks of electrochemical cells 30, 32, and 34, a system for circulating electrolyte 40, and an optional a gas management system 94. The configuration of each of these components will now be described in more detail.

FIG. 1 depicts the container 50 that houses, for example, the components shown in FIG. 2. The container 50 can be configured in some embodiments to be an integrated structure that facilitates or provides one or more of the following characteristics: compact design, ease of assembly, transportability, compact multiple-container arrangements and structures, accessibility for maintenance, and secondary containment.

In the illustrated embodiment of FIGS. 1 and 2, the representative container 50 comprises two major compartments that house components of the RFB 20. In some embodiments, the division between the first and second compartments 60 and 62 is a physical barrier in the form of a bulkhead 70 (see FIG. 3B), which may be a structural or non-structural divider. The bulkhead 70 in some embodiments can be configured to provide secondary containment of the electrolyte stored in tank assemblies 22 and 24. In another embodiment, a secondary structural or non-structural division can be employed to provide a physical barrier between the anolyte tank 22 and the catholyte tank 24. In either case, as will be described in more detail below, the tanks 22 and 24 are configured as so to be closely fitted within the compartment or compartments, thereby maximizing the storage volume of electrolyte within the container 50, which is directly proportional to the energy storage of the battery 20.

In some embodiments, the container 50 has a standard dimensioning of a 20 foot ISO shipping container. In one representative embodiment shown in FIGS. 1 and 2, the container has a length A which may be 20 feet, 8 feet in width B, and 9½ feet in height C, sometimes referred to as a High-Cube ISO shipping container. Other embodiments may employ ISO dimensioned shipping containers having either 8 feet or 8½ feet in height C, and in some embodiments, up to 53 feet in length A. In some of these embodiments, the container 50 can be additionally configured to meet ISO shipping container certification standards for registration and ease of transportation via rail, cargo ship, or other possible shipping channels. In other embodiments, the container may be similarly configured like an ISO shipping container. In other embodiments, the container has a length in the range of 10-53 feet and a height in the range of 7-10 feet.

The container 50 also includes various features to allow for the RFB 20 to be easily placed in service and maintained on site. For example, pass-through fittings are provided for passage of electrical cabling that transfers the power generated from circulation of the anolyte and the catholyte through the stacks of electrochemical cells. In some embodiments, the container 50 includes an access hatch 80, as shown in FIG. 1. Other hatches, doors, etc. (not shown) may be included for providing access to systems of the RFB 20.

String Capacity Management of Electrolyte

Passive capacity management techniques have been shown to maintain stable performance under most conditions for a single battery. However, other operating conditions may occur that require active capacity management, especially on the string and site level.

Described herein are systems and methods of operation designed for improving performance on a string and site level. For example, in some embodiments of the present disclosure, performance can be improved by matching the state of charge when a string includes multiple batteries having different states of charge. In other embodiments of the present disclosure, when an islanded system is turned off, stored energy can be preserved and used to restart the system on its own.

In one example, stack variation caused by differences in manufacturing assembly and materials may produce slightly different performance characteristics between each of the four RFBs 20 in a string 10 (see exemplary string diagrams in FIGS. 2 and 6), in some cases leading to different membrane ion transfer capabilities or different levels of side reactions, both of which contribute to performance mismatch in a string of batteries. One mechanism that may be affected by manufacturing differences in stacks can be seen during battery operation in the way ions travel back and forth through the membrane separating positive and negative electrolytes as they form a closed electrical circuit, and in the way water molecules travel through the membrane together with other hydrated ions or by themselves. As a result of stack differences, the volume of the positive and negative electrolytes and the concentrations of active ions in the electrolytes may change at different rates during battery operation.

In another example, stack variations caused by damage (leakage, blockage, etc.) to one or more stack cells may produce slightly different performance characteristics when the stacks are assembled as batteries and strings, and may also cause an imbalance in the predetermined battery tank volume ratio described above. Other reasons for stack variation may include differences in the electrode, stack compression, etc.

Because there may be performance differences between batteries in a string and all batteries in a string are electrically connected for charge and discharge operations, the worst performing battery may determine the performance of the string. Further, because each battery in the string has dedicated electrolyte tanks, lower performing batteries may continue to experience declining performance caused, for example by the by stack variation described above. Declining battery capacity is generally indicative of or may lead to electrolyte stability and capacity problems for the associated string. If left unchecked, these performance variations may result in decreased capacity across a string (or a site).

The possible effect of decreasing performance of one or more batteries in a string is illustrated below in EXAMPLES 1 and 2, using data based on open circuit voltage (OCV) values measured on the cell, stack, and battery level for each RFB in a string. OCV directly corresponds to SOC and is one measure of the state-of-charge (SOC) of a vanadium redox flow battery (VRFB), and is defined as the difference in electrical potential between two terminals of a device when it is disconnected from the circuit, for example, selected anolyte and catholyte reference points for each redox flow battery (see, e.g., FIG. 10).

Matching SOC in a string mitigates performance degradation of a battery string, as illustrated below in EXAMPLE 3.

Example 1

Energy Density

Figure 7:
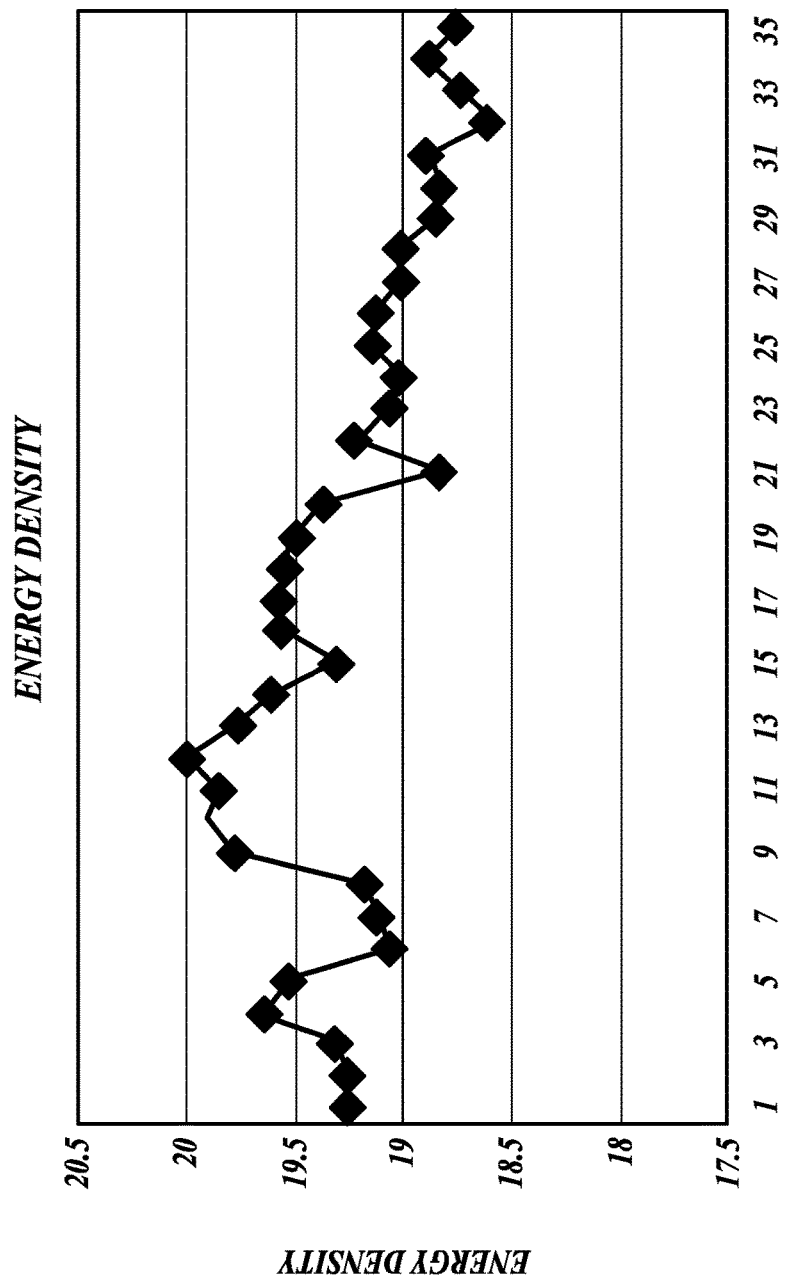
FIGS. 7-9 are graphical depictions of data regarding capacity management in an exemplary vanadium RFB string.

In a string of three, series-connected, kW-scale batteries without capacity management adjustments, a steady decline in energy density over 35 cycles can be seen in FIG. 7.

Example 2

Open Circuit Voltage

Figure 8:
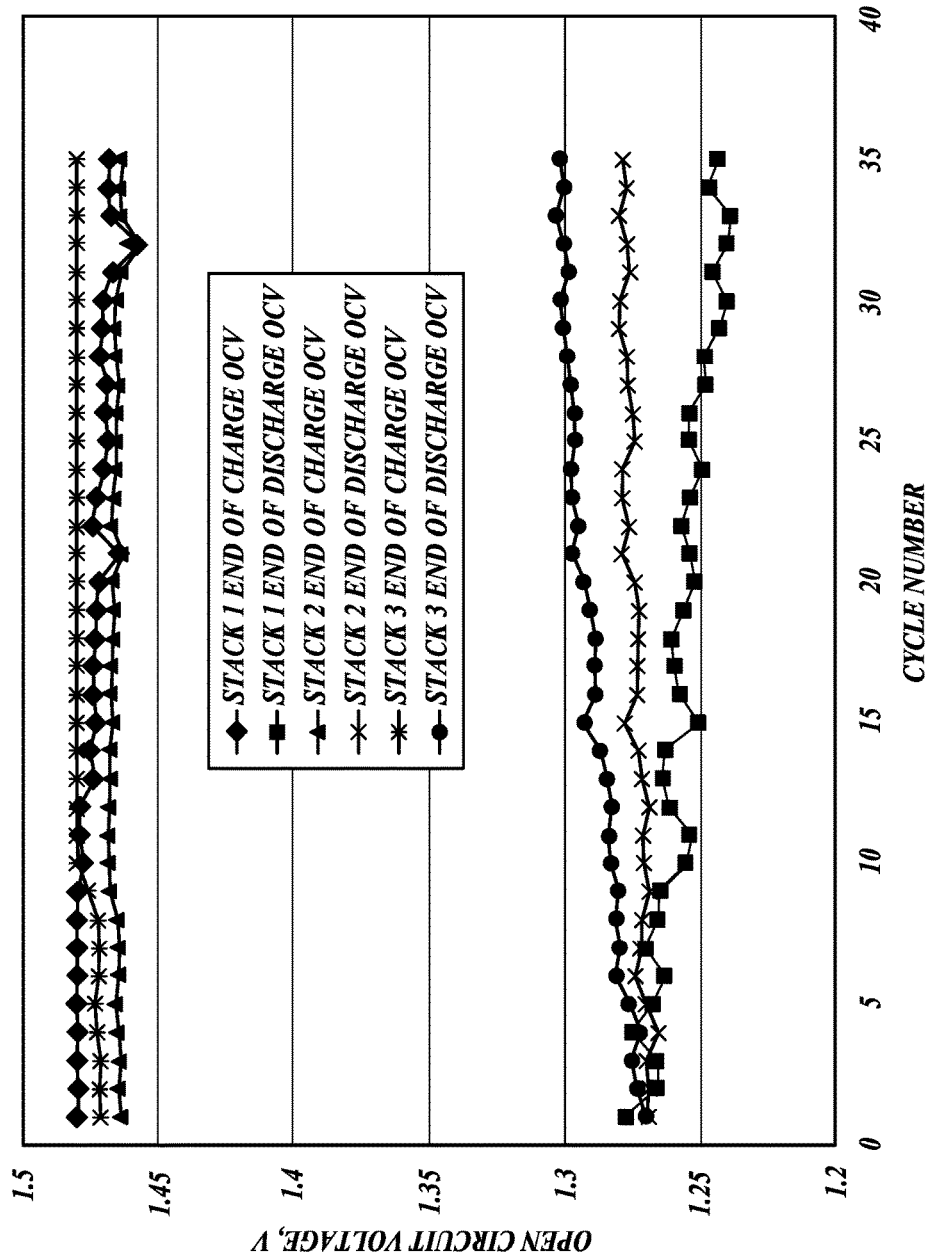

In a string of three, series-connected, kW-scale batteries without capacity management adjustments, a steady deviation in open circuit voltage (OCV) at the end of discharge over 35 cycles can be seen in FIG. 8.

Example 3

Stack Performance Recovery

Figure 9:
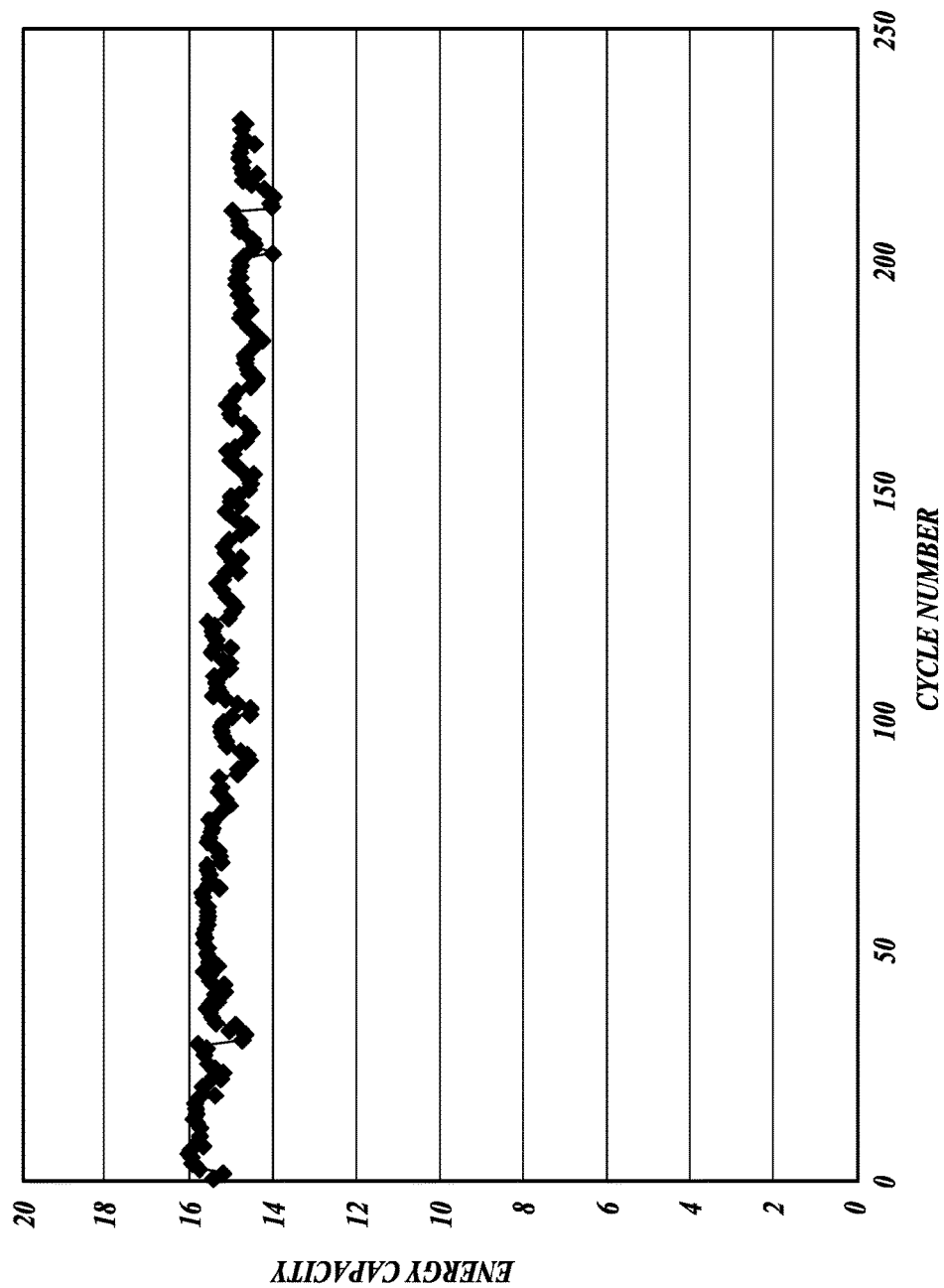

In a string of three, series-connected, kW-scale batteries with capacity management adjustments, the energy density decline of about 7% is shown in FIG. 9 for over 200 cycles. As compared to the energy density decline in FIG. 7 of about 7% over only 35 cycles, matching operation mitigates performance degradation effects in one or more batteries in a string.

Active Electrolyte State-of-Charge (SOC) Measurements

Figure 10:
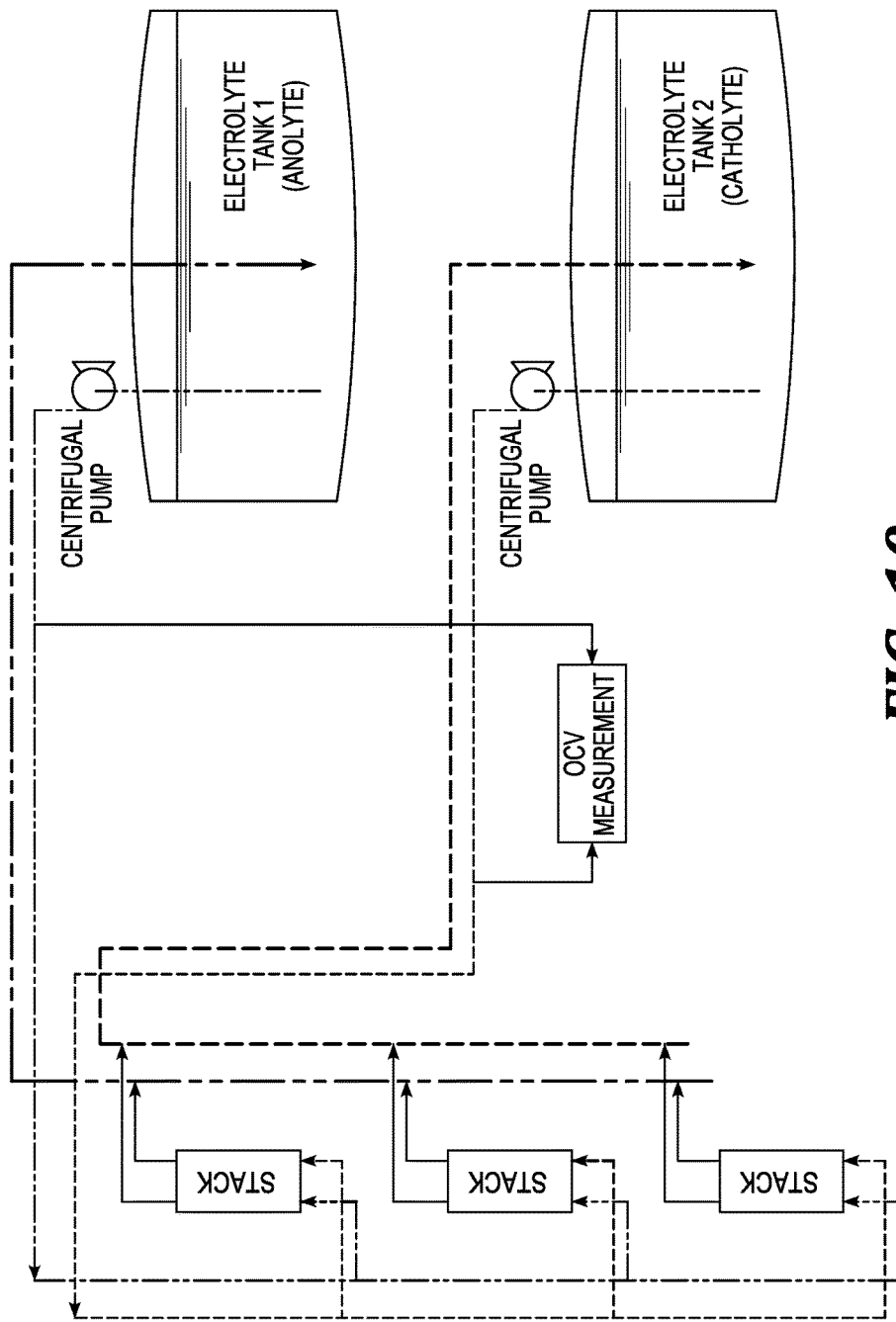
FIG. 10 is a schematic view of an RFB module showing an exemplary open circuit voltage (OCV) measurement.

To manage battery capacity on the string (or site) level, state-of-charge (SOC) values are determined for each RFB. See FIG. 6 showing "Battery OCV" determinations for each battery in the string. As one non-limiting example in a vanadium redox flow battery (VRFB), SOC can be determined using an open circuit voltage (OCV) measurement, which is the difference in electrical potential between two terminals of a device when it is disconnected from the circuit. For example, as shown in FIG. 10, OCV for a VRFB can be measured using a small electrochemical cell as the potential between the anolyte and catholyte solutions.

Other ways of determining SOC besides OCV are also within the scope of the present disclosure, such as recording and analyzing the amount of energy entering and leaving the battery over a given time period, which may be referred to as coulomb counting.

Determining Target State-of-Charge (SOC) Value

After determining SOC, a selected SOC value can be determined as a target value for the other batteries in the system. Therefore, in accordance with one embodiment of the present disclosure, the other RFBs in the string can then be adjusted to correspond to the selected SOC value. The target SOC value is a function of the SOC values for all of the plurality of redox flow batteries in the string.

As a non-limiting example, the target SOC value may be the lowest SOC value in the string.

As another non-limiting example, the target SOC value may be an average string SOC, which may or may not omit the underperforming battery from the calculations.

As another non-limiting example, the target SOC value may be a maximum deviation from the average string SOC value.

As another non-limiting example, the target SOC value may be a target SOC value determined by an algorithm based on conditions in the string. The target SOC value may be a conditional value based on transient operating parameters.

In a dynamic system, the predetermined or target value will change continually based on changing conditions in the string. The target SOC value may be subject to change based on one or more of the following conditions: low SOC; an unusually large load on the system; high discharge; and other external conditions.

Adjusting the target SOC may be controlled by the battery management system (BMS) during battery operation or may be performed during maintenance of the redox flow battery.

Adjusting SOC to Match State-of-Charge in a Battery String

In accordance with embodiments of the present disclosure, a method of operating a redox flow battery string is provided. The string includes a plurality of redox flow batteries, for example, at least first and second redox flow batteries. The string also includes an outside power source that provides power to operate the string.

The outside power source may be a main power source, such as a grid, or may be a secondary power source, such as a non-grid power source, for example, a generator or other auxiliary power device.

The plurality of redox flow batteries in the string are electrically connected in series or parallel.

In accordance with embodiments of the present disclosure, one exemplary method for adjusting the SOC value for at least one of the redox flow batteries in the string to correspond to the target SOC value includes using a portion of the stored energy in the at least one redox flow battery to supply power to the electrical load that operates the at least one redox flow battery. In one embodiment of the present disclosure, adjusting the SOC value for at least one redox flow battery in the string to correspond to the target SOC value includes reducing the SOC value for at least one redox flow battery in the string to correspond to the target SOC value.

Figure 11:
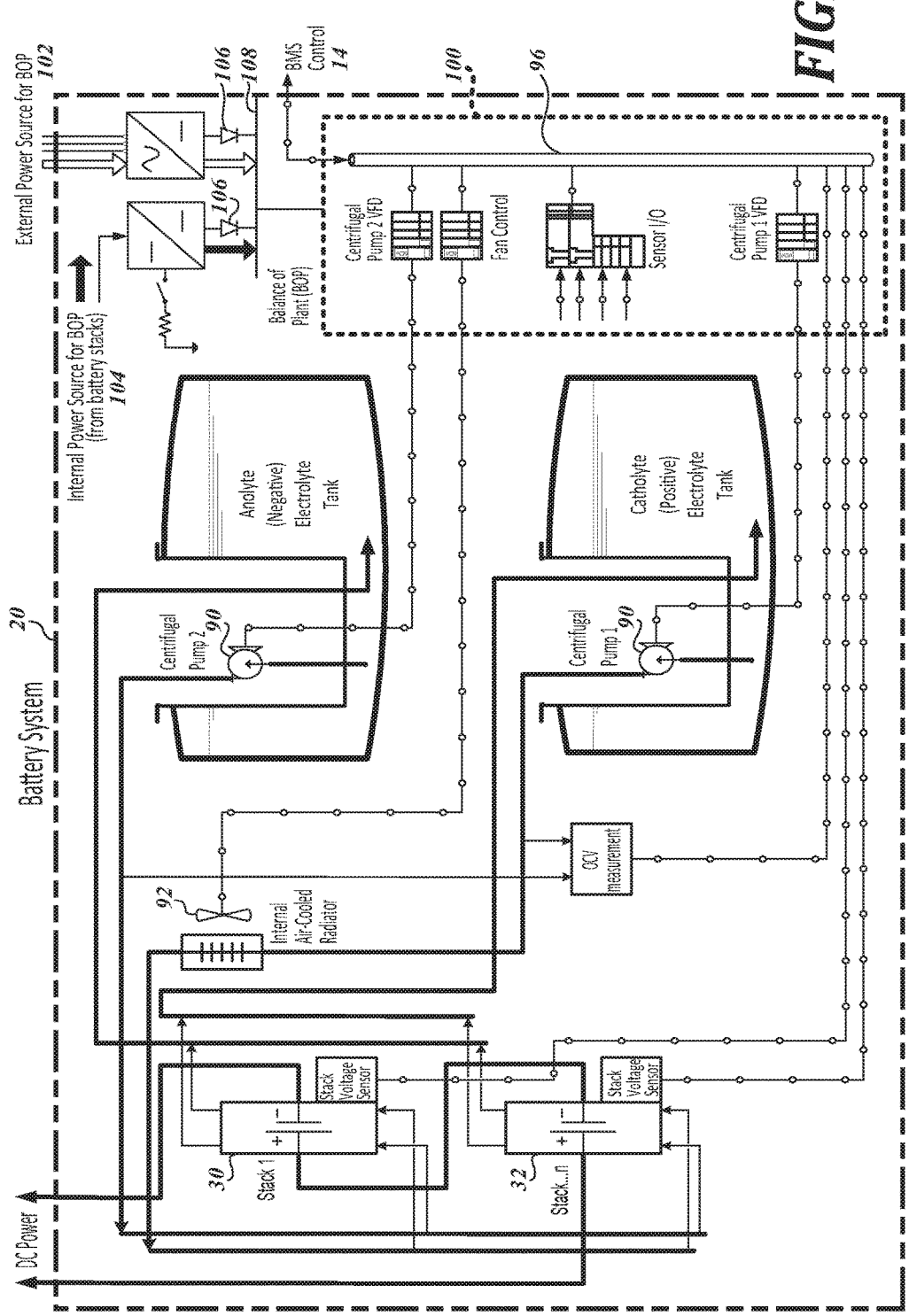
FIG. 11 is a schematic view of an RFB module showing exemplary balance of plant (BOP) loads.

The electrical load, also referred to as the balance-of-plant (BOP) load, for the exemplary 125 kW redox flow battery shown in FIG. 4 is approximately 3 kW. Referring to FIGS. 6 and 11, the exemplary BOP load comprises auxiliary power required for operating battery component equipment such as the anolyte and catholyte electrolyte pumps 90, cooling system fans 92, instrumentation and electrical control systems 96, battery management system 14, etc. "BOP loads" 100 are shown for each redox flow battery in the string.

Supplying power to the electrical load that operates the at least one redox flow battery may include a portion of BOP load or all of the BOP loads for the RFB. For example, different components of the RFB system 20 (for example, those shown in FIG. 11) may be turned off or on to reduce or increase the BOP load.

Figure 12:
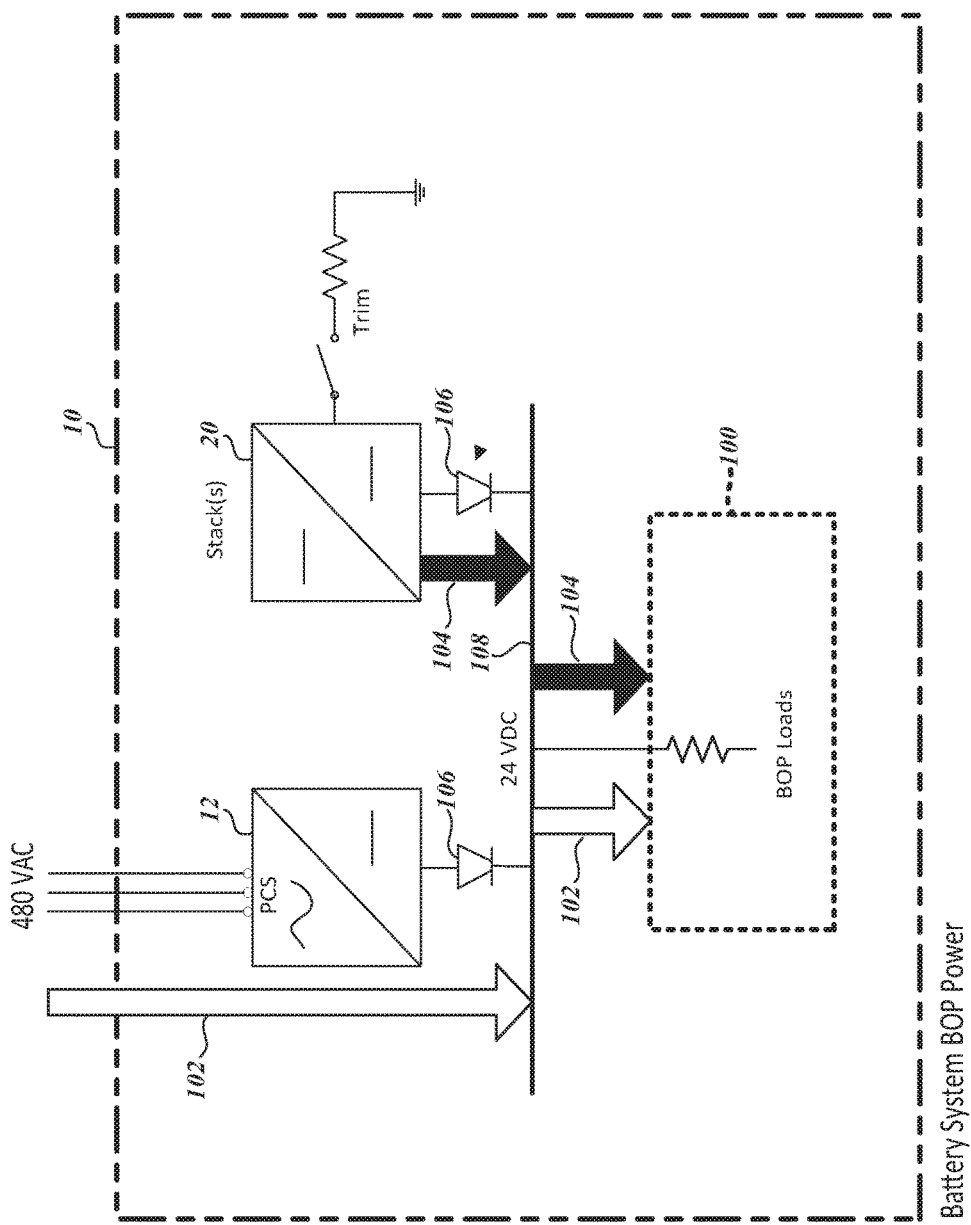
FIG. 12 is a schematic view of power delivery to BOP loads in an RFB module.

Referring to FIG. 12, the battery system has a dual feed control power system. In that regard, BOP loads 100 may be powered using an external power source 102 or an internal power source 104 derived from the energy stored in the redox flow battery system 20. In the illustrated embodiment of FIG. 12, power is only supplied from either an external power source 102 or an internal power source 104. However, a combination of power sources is within the scope of the present disclosure.

In the illustrated embodiment of FIG. 12, power is supplied to the BOP loads using a 24 VDC bus 108. Diodes 106 in the illustrated embodiment of FIG. 14 prevent the reverse flow of power.

Typically, the BOP load 100 is powered by an outside power source 102. When the SOC of a battery in a string is high relative to the other batteries, the stored energy in the battery from the internal power source 102 can be used to power its BOP load 100 to reduce the SOC of the battery. Therefore, at least one battery 20 in the string 10 uses stored energy in the battery to power its BOP load 100 and at least another battery in the string uses energy from an outside power source to power its BOP load.

Adjustment to reduce the SOC value of the battery having a high SOC value such that its SOC value is closer to a target value to provide a closer match of the SOC value(s) of the other batteries in the string. Such matching operation helps to mitigate performance degradation of a battery string. In addition, matching can help to compensate for manufacturing tolerances in battery module performance.

Islanded Power Systems

A main power grid is an interconnected network for delivering electrical power, typically produced by large-scale power stations. An islanded power system is a power system that operates, or is capable of operating, independent of a main power grid.

A micro-grid is one example of an islanded power system. A micro-grid is an islanded power system that is much smaller in scale than the main power grid. A micro-grid may be used, for example, to power remote facilities or communities where connections to the main power grid are unavailable, or to provide backup power in the event of an outage in the main power grid. A micro-grid may be coupled to the main power grid. A micro-grid may include a switch that allows the micro-grid to operate in a grid-connected mode or in an island state to operate independent of the main power grid. Island state can be useful, for example, when the main power grid (or a connection to the main power grid) is not functioning or is unreliable. Alternatively, a micro-grid may operate always in an island state, such as in remote locations where connections to the main power grid are not available.

Figure 13:
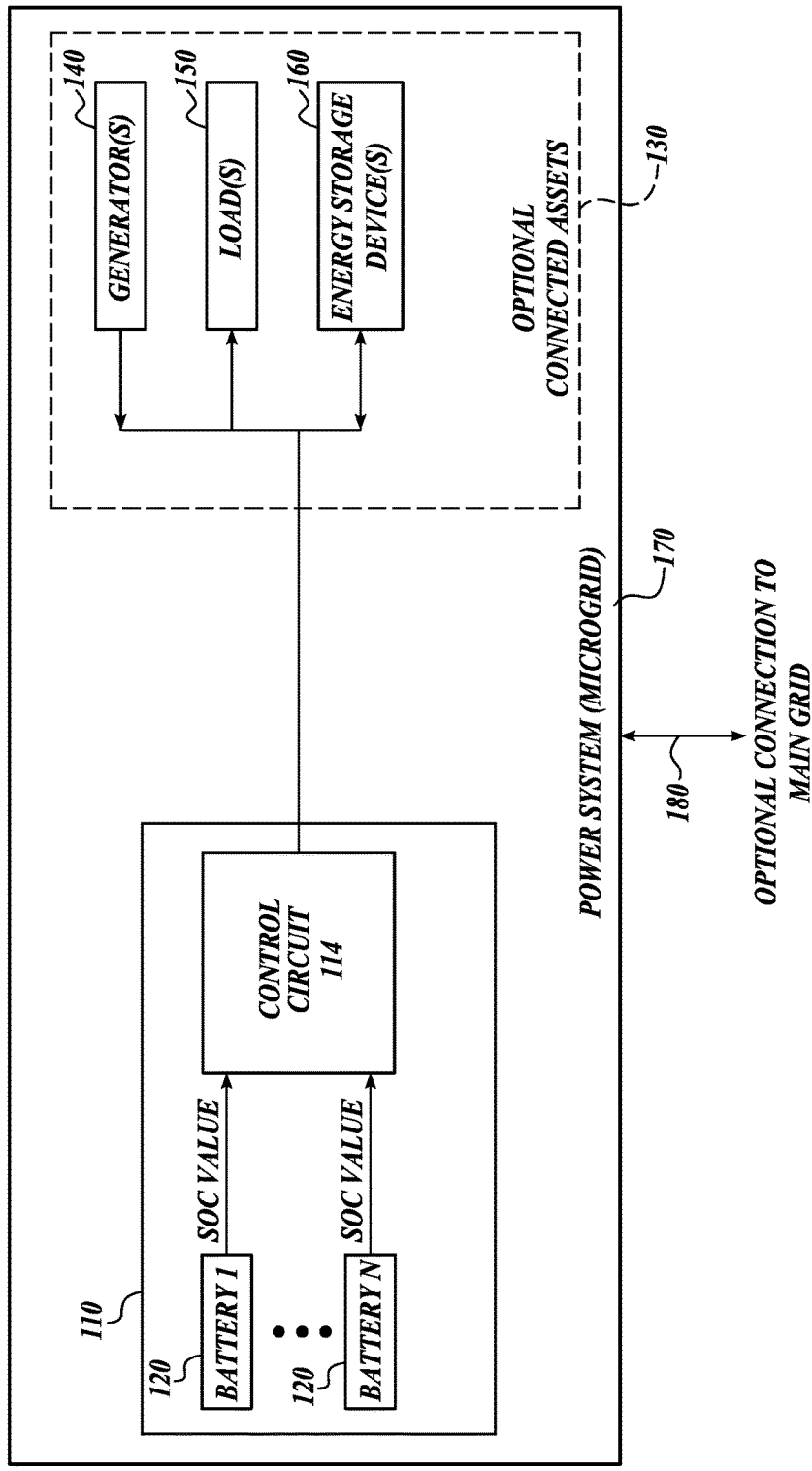
FIG. 13 is battery system, showing an island system and an optional connection to a main grid.

FIG. 13 is a block diagram of an illustrative micro-grid 170. In the example shown in FIG. 13, the micro-grid 170 includes a battery system 110 comprising a control circuit 114 (e.g., a BMS as described above) and one or more batteries 120 (e.g., a string of RFBs as described above). As shown, the battery system 110 is connected to one or more loads 150 (e.g., lighting systems, heating/cooling systems, or other electrical loads) on the micro-grid that can be powered by the battery system. The micro-grid 170 also may include other power sources such as one or more generators 140 (e.g., diesel generators, wind-powered generators) or other power sources (e.g., solar panel arrays), and/or one or more other energy storage devices 160 separate from the battery system 110, and/or one or more optional connected assets 130.

The micro-grid 170 also includes an optional connection 180 to a main power grid. If the optional connection to the main power grid is present, the micro-grid also includes a switch (not shown) to allow the micro-grid to operate in a grid-connected mode or in an island state.

Using System Stored Energy for Black Start

In some situations, a battery system 20 in accordance with embodiments of the present disclosure may be turned off with the battery system 20 having a stored amount of energy. To turn back on, the battery system 20 may rely on energy from an outside energy source, such as a main power grid or an auxiliary power source, to power start up functions in the battery system 20. When the battery system 20 is in an island state, it is not connected to the main power grid, and may not have auxiliary power resources for start-up.

In accordance with embodiments of the present disclosure, when a battery system is in an "island" state and an "off" state, the battery system 20 includes a method for preserving power reserves to restart and restarting by using stored power in the battery system 20. Referring to FIG. 3A, power is stored in the electrolyte 40 in the electrochemical cells 30, 32, 34 of each redox flow battery 20 after a battery transitions from an "on" state to an "off" state.

When islanded, the system may be configured to be in an island state, or may be forced into an island state as a result of the loss of grid power, for example, in the event of a grid failure.

An amount of stored energy in the electrochemical cell when the redox flow battery is in the off state can be maintained by exchanging electrolyte from the anolyte and catholyte storage tanks with the electrolyte in the electrochemical cell. The electrolyte containing stored energy in the electrochemical cell has a state of charge (SOC) value, which may dissipate and lose capacity over time as a result of self-discharge.

Therefore, to counteract lost energy storage capacity and maintain a baseline SOC in the electrochemical cell, stored energy remaining in the electrolyte in the electrochemical cell can be used to transfer new electrolyte with higher energy capacity from the anolyte and catholyte storage tanks into the electrochemical cell. The reduced energy capacity electrolyte, in exchange, is returned to the anolyte and catholyte storage tanks.

Such exchange may occur on a periodic basis, for example, continuously, as a result of demand from the system, as a result of a SOC determination, or based on a predetermined time schedule. As non-limiting examples, predetermined time schedules may be once every 10 hours, once every 20 hours, once every 40 hours, or any other time schedule based on known information about the system, whether regular or irregular.

As a non-limiting example, in the exemplary 125 kW system shown in FIG. 4, the maximum amount of energy stored in the electrochemical cells of the stacks that is available for black start at full SOC is approximately 8 kWh. When the system is caused to enter an off state in this condition, the energy stored in the electrochemical cells of the stacks and available to maintain black start ready state decreases by approximately 2% per hour. After 20 hours, the remaining energy is approximately 4.8 kWh. After 40 hours, the approximately 1.6 kWh of energy available in the electrochemical cells of the stacks should be used to power the system to replenish the electrochemical cells with charged electrolyte from the storage tanks to ensure continued black start availability.

The transfer of electrolyte may require stored energy to run transfer pumps and/or other control systems in the redox flow battery, collectively referred to above as BOP. The transfer pumps may include a main transfer pump for the overall system, auxiliary pumps, or individual catholyte and anolyte transfer pumps. Other components which may require stored energy include instrumentation, for example, for SOC determination and the battery management system (BMS) which controls battery operation.

When the battery is ready to be restarted, the stored energy remaining in the electrolyte in the electrochemical cell can be used to restart the battery to its on state.

A periodic state of charge (SOC) determination can identify the amount of stored energy in the electrolytic cells when the system is turned off and the electrolyte pumps are stopped.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A method of operating a redox flow battery string including at least first and second redox flow batteries and an outside power source, comprising:
    providing a least first and second redox flow batteries in a string electrically connected in a string, and each redox flow battery in the string comprising an electrochemical cell in fluid communication with anolyte and catholyte storage tanks, and each redox flow battery having a state-or-charge (SOC) and an electrical load, wherein the electrical load for at least one of the first and second redox flow batteries is powered by the outside power source;
    obtaining an SOC value for each redox flow battery in the string;
    identifying a target SOC value in the string; and
    adjusting the SOC value for at least one of the first and second redox flow batteries in the string to correspond to the target SOC value by using a portion of stored energy in at least one first or second redox flow batteries to supply power to the electrical load.

2. The method of claim 1, further comprising a third redox flow battery in the string.

3. The method of claim 1, wherein the electrical load for each of the redox flow batteries in the string is a balance of plant electrical load required to operate each of the plurality of redox flow batteries in the string.

4. The method of claim 1, wherein the target SOC value is a function of the SOC values for all of the redox flow batteries in the string.

5. The method of claim 1, wherein adjusting the SOC value for at least one redox flow battery in the string to correspond to the target SOC value includes reducing the SOC value for at least one redox flow battery in the string to correspond to the target SOC value.

6. The method of claim 1, wherein adjusting the SOC value for at least one of the first and second redox flow batteries in the string is controlled by a battery management system.

7. The method of claim 1, wherein each of the redox flow batteries in the string are vanadium redox flow batteries, and wherein the SOC value for each redox flow battery in the string is an open circuit value (OCV) measurement.

8. The method of claim 7, wherein the OCV measurement is the difference in electrical potential between selected anolyte and catholyte reference points for each redox flow battery.

9. The method of claim 1, wherein the SOC value for each redox flow battery in the string is measured by coulomb counting.

10. The method of claim 1, wherein the redox flow battery string is an islanded system including at least first and second redox flow batteries and an outside power source, wherein the outside power source is independent of the grid.

11. The method of claim 10, wherein the auxiliary power source is an energy generator or another battery.

12. A method of operating a redox flow battery string including at least first and second redox flow batteries and an outside power source, comprising:
    providing a least first and second redox flow batteries in a string electrically connected in a string, and each redox flow battery in the string comprising an electrochemical cell in fluid communication with anolyte and catholyte storage tanks, and each redox flow battery having a state-or-charge (SOC) and an electrical load, wherein the electrical load is a balance of plant electrical load required to operate each of the plurality of redox flow batteries in the string, wherein the electrical load for at least one of the first and second redox flow batteries is powered by the outside power source;

obtaining an SOC value for each redox flow battery in the string;

identifying a target SOC value in the string, wherein the target SOC value is a function of the SOC values for all of the redox flow batteries in the string; and adjusting the SOC value for at least one of the first and second redox flow batteries in the string to correspond to the target SOC value by using a portion of stored energy in at least one of the first or second redox flow batteries to supply power to the electrical load of at least one of the first and second redox flow batteries.

* * * * *